United States Patent [19]

Dey

[11] 4,118,761
[45] Oct. 3, 1978

[54] LIGHT CONDENSING ILLUMINATOR

[75] Inventor: Thomas W. Dey, Rochester, N.Y.

[73] Assignee: Bausch & Lomb Incorporated, Rochester, N.Y.

[21] Appl. No.: 772,887

[22] Filed: Feb. 28, 1977

[51] Int. Cl.² .................. F21V 7/00; F21V 5/00; G02B 5/08; G03B 21/08

[52] U.S. Cl. ...................... 362/297; 362/327; 350/299; 353/64

[58] Field of Search ............... 362/297, 301, 303, 341, 362/296, 298, 326, 327; 350/7, 299, 211; 353/63, 64

[56] References Cited

U.S. PATENT DOCUMENTS

| | | | |
|---|---|---|---|
| 1,357,034 | 10/1920 | D'Humy | 362/297 |
| 1,737,027 | 11/1929 | Schoonmaker | 362/301 |
| 3,586,849 | 6/1971 | Starkweather | 362/297 |
| 3,744,892 | 7/1973 | Shipsey | 353/63 |
| 3,752,575 | 8/1973 | Ataka | 350/211 |
| 3,877,802 | 4/1975 | Greenspan | 350/299 X |

Primary Examiner—J D Miller
Assistant Examiner—Peter S. Wong
Attorney, Agent, or Firm—Frank C. Parker; Bernard D. Bogdon

[57] ABSTRACT

A compact light condensing illumination system for the concentration of light at an area provides a light source capable of having a relatively shallow reflector with a relatively small aperture directing collimated light toward a planar reflector of rectangular configuration having a mirrored surface configured with relatively short grooves extending at an angle to the direction of the collimated light to uniformly reflect the light toward a planar grooved mirror disposed substantially at a right angle to the first mirrored surface and of relatively large surface to reflect the light in substantially parallel rays to a Fresnel lens of relatively low power for condensing of the light rays to concentrate the light at a preselected distance from the Fresnel lens.

12 Claims, 12 Drawing Figures

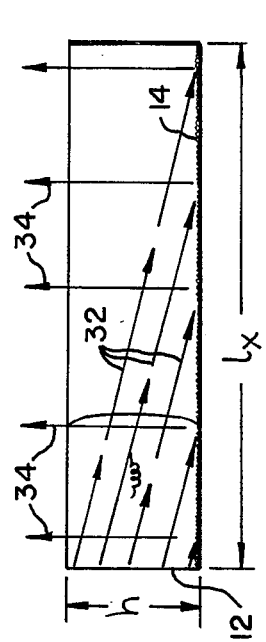
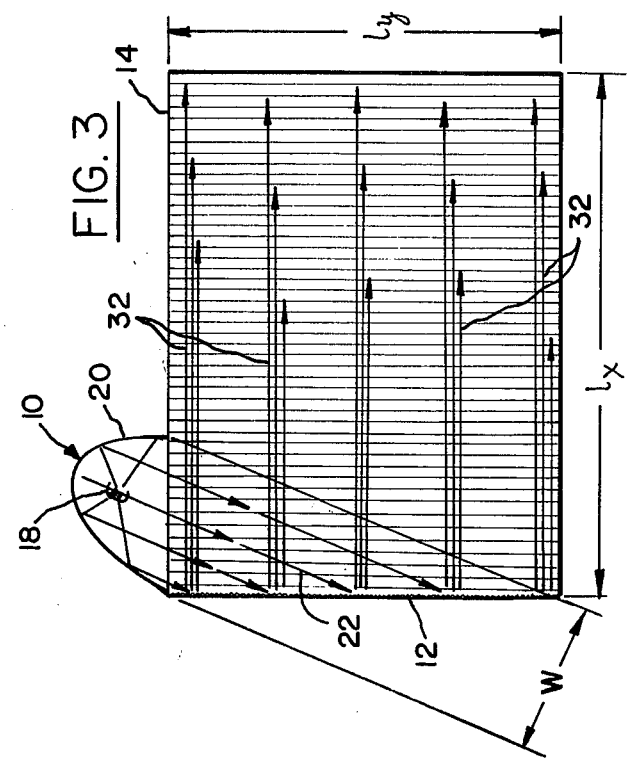
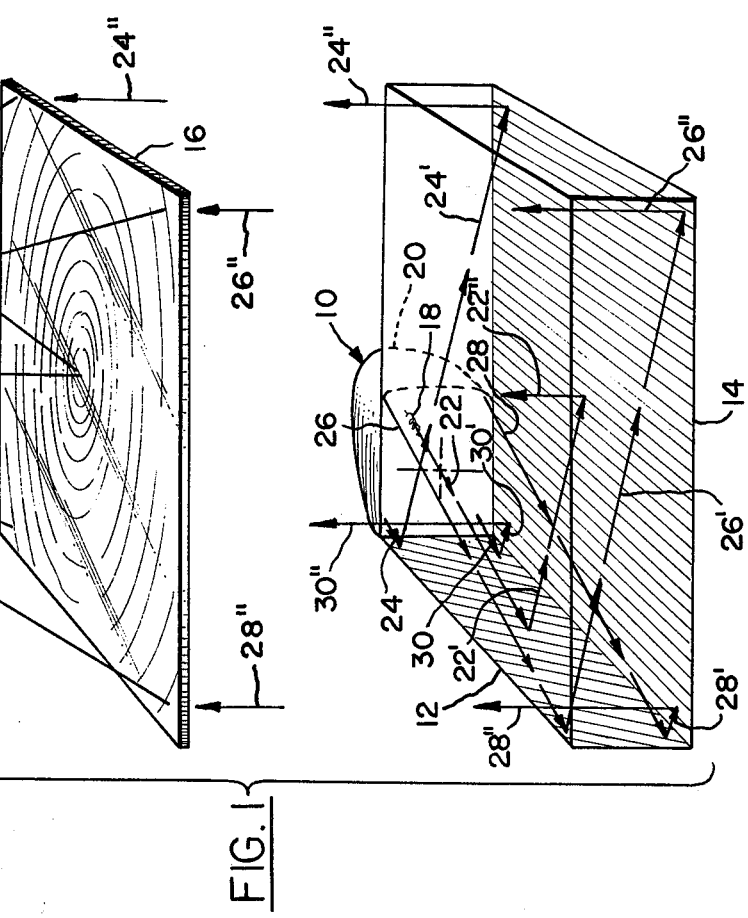

LIGHT CONDENSING ILLUMINATOR

BACKGROUND OF THE INVENTION

1. Field of the Invention

The present invention is directed toward a compact light condensing illuminator and particularly to a light condensing illuminator including a collimated light source which transmits light to a ruled mirror reflector system for concentration of the light after passage through a lens.

2. Description of the Prior Art

Illuminators for use in such devices as overhead projectors have of necessity been rather large and of substantial vertical height in order to accommodate a large reflector or a lens having disposed at its focal center a high powered light source in order to provide sufficient illumination power. In such projectors not only is the resultant equipment quite large but also its construction adds to its increased weight and diminishes the prospects of it being a suitable portable instrument.

From an operator's standpoint, it is frequently necessary to place subject material for projection upon the projector stage and either refer to it by pointer or annotate the subject material by marking its surface during the course of any discussion or presentation which the operator may be making. Such projectors, for the most part, have significant side glare which is controllable but generally only through the use of costly specially designed lens systems or louvered screens to prevent glare in the direction of the operator. These added devices or elements also increase the size and weight of the unit.

Projectors of this kind are expensive to manufacture and thus to procure because of their mass and of the cost of parts necessary to provide power to meet acceptable projector standards.

In overhead projectors and other instruments which use large condensing illuminators, a pair of high powered Fresnel lenses are generally disposed in a face-to-face relationship. One inherent undesirable feature of double high powered Fresnel lenses is side glare as hereinbefore mentioned. Such units first receive illumination from a high powered standard light source at one of the Fresnel lenses to collect the widely dispersed light and pass it to the second of the Fresnel lenses to condense the light at some point or distance from the lens. In such high power lenses, there is a great loss of light at the extremities of the lens, which accounts for the low efficiency of high power Fresnel lenses at the edges. Further, vignetting is a serious problem encountered in the use of high power Fresnel lenses. The distances of the light paths from the source filament to the lens vary greatly. When comparing, for example, the path of light traversing the axis of the lamp with the path of light directed toward the extremity of the lens the distance difference is at its maximum. The greater light path distance between the source and the lens edge causes the edge of the lens or projection screen to look substantially darker than its center area.

The use of ruled or grooved mirror optical elements to reflect or otherwise act upon light rays is well known in the art. Planar grooved reflectors have been used, for example, as disclosed in U.S. Pat. No. 3,877,802 entitled "Method of Enlarging Images Without Lenses and Display Devices Utilizing the Same" issued Apr. 15, 1975 for inventor M. Greenspan. In the Greenspan disclosure, an object of the invention, to which the disclosure is so directed, provides for a lenseless system of enlarging images along at least one of the orthogonal axes without depending upon the radiation properties of a point source of light.

SUMMARY OF THE INVENTION

This invention provides a highly efficient illuminator system of relatively inexpensive simplified construction and design and of unusual compactness to provide highly concentrated light which is especially amplified from the level of light originating from a selected collimated light source. A collimated light source of suitable construction and one which, for example, is commercially available is acceptable for serving as the illumination light source in the present invention. Collimated light is directed at a reference surface which is configured to reflect the light uniformly in parallel paths onto a reflective surface of substantially greater size. The second reflective surface uniformly transmits the light in paths of substantially equal length to a lens for condensing the light rays ideally at a point or small area which is at a preselected distance from the lens.

The first reflective surface, which is the smaller of the two surfaces, is generally planar and is disposed in the path of the collimated light to intercept substantially all of the collimated light. The planar reflector is disposable at variable angles to the path of the collimated light. Preferably, the planar reflector is skewed to cut across the light path such that the light which emanates from the collimated light source travels different distances to reach the boundaries of the planar reflector. Whatever the angle that the mirror is inclined to the collimated light path, it is preferred that the center axis of the light path pass through the center of the first reflective surface.

Both planar reflectors are configured to most efficiently receive and reflect the light transmitted to the surfaces of each. Preferably, the surfaces are grooved in a saw-tooth or stepped configuration when viewed in cross-section. Continuous reflective surfaces which have discontinuous slope such as grooved mirrors, gratings, ruled or echelon marked optical elements enable preselected disposition and orientation of the reflective surfaces while controlling the direction of the reflected light. Other configurations are acceptable but may not be as desirable because of their inefficiency. The reflective grooves, for example, may be utilized at an undersurface or second surface of the planar reflector. The first reflective surface is disposed to have its grooves inclined to the path of the collimated light from the light source with its orientation selected to provide for uniform illumination within the boundaries of the designed instrument. The second reflective surface is disposed to receive the light and transmit it in parallel light paths.

A low powered Fresnel lens is disposed for receiving the parallel light rays reflected from the second planar reflector and condenses the light at a preselected distance from the lens. This inventive system provides for a greater amplitude of illumination at the preselected area.

Alternative configurations of the inventive illumination system include, for example, systems having a plurality of collimated light sources. When considering an embodiment according to the principles of this invention, which is generally in the shape of a very thin square box, collimated light sources are preferably disposed on a given side of the box unit proximate the corner where the given side intersects the side mounting the planar reflective surface to which the light source transmits its collimated light. Particularly, good results can be obtained by mounting two collimated light sources on one given side of the box unit at opposite ends of the given side. In this configuration two diametrically opposed planar reflective mirrors are used. A third configuration might include two collimated light sources mounted on opposite sides of the box unit both of which are proximate to one wall which supports a single planar reflective surface. Alternative embodiments which could include two collimated light sources at diagonally opposite corners of the box unit or alternatively light sources at all four corners of a box unit are possible.

This invention has applications which can relate to illumination for optical imaging systems and processes and apparatus which encompass the principles of diascopic imaging. Diascopic imaging is defined as imaging operative upon light generally transmitted through an object or transparency which is intended to be viewed.

Other applications include illuminators such as medical lamps which concentrate the light energy at an examination area for use, for example, during surgery to illuminate the work area of the practitioner. Another practical application includes a transparency illuminator for graphical data transfer instruments. In such an application the concentrated illumination is 15 to 80 times the illumination provided by conventional thin illuminators. Such a graphical data transfer instrument is disclosed in U.S. Pat. No. 3,770,347, issued Nov. 6, 1973 to W. R. Ambrose et al.

BRIEF DESCRIPTION OF THE DRAWINGS

FIG. 1 is a partially exploded schematic diagram of a uniform wide aperture illuminator illustrating light ray paths according to the principles of the present invention.

FIG. 2 is a longitudinal view of a portion of the embodiment as illustrated in FIG. 1.

FIG. 3 is a plan view of a portion of the embodiment as illustrated in FIG. 1.

DETAILED DESCRIPTION OF THE PREFERRED EMBODIMENTS

Figure 5:
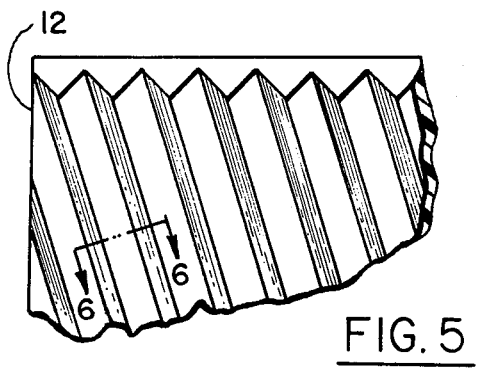
FIG. 5 is a partial perspective of the reflective element illustrated in FIG. 4.

In FIG. 1 a uniform wide aperture illuminator is schematically illustrated and includes as its principal components a collimated light source 10, a first reflector planar surface 12 for receiving collimated light, a second reflector planar surface 14 for receiving light transmitted from the first reflector 12 and a Fresnel lens 16 for receiving parallel light rays reflected from the reflector 14. As illustrated, illumination originates at the filament 18 of the light source 10 and radiates the light energy to a paraboloid shaped lamp reflector 20 of the light source 10 to transmit the light along exemplary light ray path 22 which originates from the center of the filament 18 and light ray paths 24, 26, 28 and 30, respectively representing light rays which radiate approximately from the extreme outward dimensions of the aperture of the lamp reflector 20.

The light rays 22, 24, 26, 28 and 30 are respectively directed toward the respective four corners of the outward boundaries of the planar reflective surface 12. The reflector 12 is grooved and orientated, as explained hereinafter in greater detail, to reflect the respective light rays 22', 24', 26', 28' and 30' in a downward direction to be received by the second reflector surface 14. The second reflector surface 14 also includes grooves for reflecting the received light rays in a parallel path. Respective rays 22'', 24'', 26'', 28'' and 30'' are parallel to each other and can be uniform in intensity and are directed from the planar surface to the Fresnel lens 16. The grooves of reflector 14 are not necessarily of the same configuration as those of reflector 12, as hereinafter explained in more detail.

The Fresnel lens 16 is of sufficient size to receive the reflected light rays from the second reflector 14 and to refract the respective rays less than the ray passing directly through the center of the lens. The refracted rays are then condensed as rays 22''', 24''', 26''', 28''', and 30''' toward a point F and concentrated at the point F which is located a distance D from the Fresnel lens 16.

In illuminators for optical imaging systems the distance D is generally equal to the distance from an object plane, which would be disposed on or near the surface of the Fresnel lens, to the entrance pupil of the imaging system. In devices for illuminating such as for lamps which are used to illuminate work task areas, distance D can be the focal length of the Fresnel lens. It may be desirable that the design distance be more or less than the focal length of the lens depending upon the specific application.

In designing illuminators which incorporate the principles of this invention, the elements are selected and arranged to provide for a specially compact unit and one which has a height h, as illustrated in FIG. 2, which is substantially less in dimension than either of the other coordinate dimensions $l_x$ and $l_y$ as illustrated in FIGS. 2 and 3, which define the length of each of the sides of the designed unit.

As best seen in FIG. 3 the paraboloid shaped reflector 20 is disposed at one side of the embodiment to project its collimated light beam, having a width W, to impinge upon the first reflector surface 12 at an inclined angle. It is desirable that light ray 22 which originates from the filament 18 be received approximate the center of the reflector 12 which can be defined by the intersection of the imaginary diagonals extending between the opposite corners of reflector 12. Additionally, the reflector 12 is of such size to substantially receive all of the illumination which radiates from the collimates light source 10.

Collimated light sources of any suitable type will perform satisfactorily including laser types of continuous emission or a pulsed laser for photography applications. Also condensing lenses can be implemented with a suitable source.

A collimated light source provides the significant advantage of eliminating the necessity of critically positioning the light source with respect to the first reflective surface. Further, the first or side wall reflector 12 is disposed to reflect the exemplary light rays 32 downward as best seen in FIG. 2 and at right angles to the grooves of reflector 14 as best seen in FIG. 3. The orientation and relationship of the flat planar reflector surfaces 12 and 14 causes the examplary light rays 32, illustrated in FIGS. 2 and 3, to be reflected upward and parallel to each other as illustrated by exemplary light rays 34. These parallel light rays 34 are directed toward the Fresnel lens 16.

The number of light sources useful in an embodiment according to the principles of this invention is dependent upon the specific application under consideration. Size limitations and space restrictions will frequently dictate the location of such light sources. It will be appreciated that light sources such as light source 10 can be disposed at any one or any number of corners about the compact pancake shaped unit as illustrated in FIGS. 1–3. In addition locations at other than the corners is possible with the box unit being a convenient reference system.

Figure 6:
FIG. 6 is a section of the reflective element of FIG. 5 as viewed in the direction of arrows 6—6 of FIG. 5.
Figure 4:
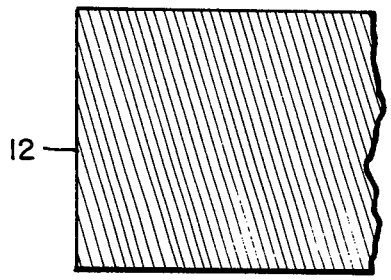
FIG. 4 is a partial illustration of an alternate embodiment of a reflective element illustrated in FIG. 1.
Figure 7:
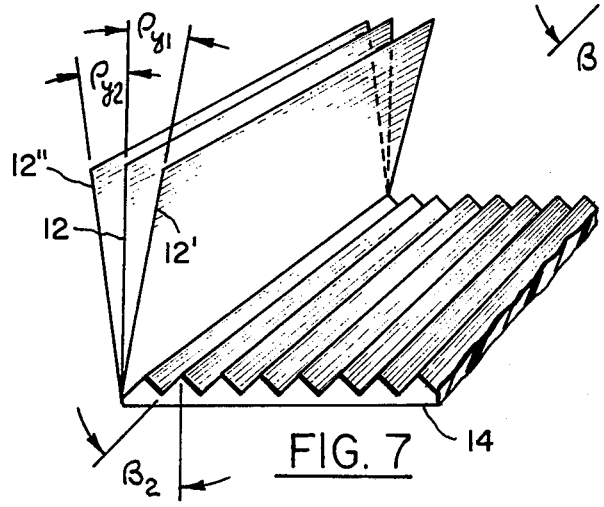
FIG. 7 is a partial illustration of alternate reflective embodiments of elements illustrated in FIG. 1.

The illustrations of FIGS. 4, 5, 6, 7, 8 and 10 and the equations which are hereinafter set forth in the disclosure are complementary to each other and are specified for a collimated light source disposed at the left-handside forefront of the illustration of the embodiment of FIG. 1. As hereinbefore mentioned, the reflector 12 has grooves which are preferably of saw-tooth cross-sectional configuration as illustrated in FIGS. 5 and 6. The orientation of the wall reflective surface with respect to the base reflector is of significant concern to the design of embodiments according to the principles of this invention. The grooves of both the base mirror and the side mirror are ideally parallel and linear and are disposed upon the substantially flat planar surface of each. The number of grooves per unit measurement is of variable value and is sufficient to prevent grooves from being super imposed on the image of the object under study. Whether grooves are visible at the image is a function of the distance between grooves, the distance between the grooves planar surface and the object under study, and the device in use. The tilt of the grooves of wall mirror 12 to the base reflector which has its grooves substantially parallel to the plane of the wall mirror is particularly important as is the inclination of the plane of the wall mirror 12 to the plane of the base mirror 14. The equations and relationships hereinafter set forth identify a method of computation of these relationships identified as the pitch angle, tilt of the grooves and inclination of the plane and are exemplary of equations useful in constructing apparatus according to the principles of the present invention. It should be noted, for example, that the groove surface 36, as shown in FIG. 6, is not of special concern where a single light source is in use. However, it will be appreciated that it is of concern if, for example, two illumination sources are used at opposite corners of the illumination with a single reflective side mirror. The side reflective mirror pitch angle is specified as $\beta_1$ as illustrated in FIG. 6. It should be noted that angle $\beta_1$ is measured in a plane perpendicular to the grooves, as shown in FIGS. 5 and 6, and is measured from the reflective side of the groove. The side or wall mirror positioning or orientation is specified by the groove tilt angle $\rho_x$ which is measured in the plane of the mirror as illustrated in FIG. 4 and by the mirror tilt angle $\rho_y$ as illustrated in FIG. 7. In FIG. 7, angle $\rho_{y1}$ illustrates reflective wall 12 as tilted toward the base mirror 14 to become wall 12' and is a positive $\rho_y$ angle, whereas angle $\rho_{y2}$ is a negative measurement when wall 12 is tilted back to become wall 12''.

The three parameters $\beta_1$, $\rho_x$ and $\rho_y$ are related to the original input variables $l_x$, $l_y$, $h$ and $W$ as illustrated in FIGS. 2 and 3 by the following set of equations:

$$\tilde{A} = [\sin \beta_1, -\cos \beta_1, 0] \tag{a}$$

$$N_x = A_x \cos \rho_y + (A_z \cos \rho_x + A_y \sin \rho_x) \sin \rho_y \tag{b}$$

$$N_y = A_y \cos \rho_x - A_z \sin \rho_x \tag{c}$$

$$N_z = (A_z \cos \rho_x + A_y \sin \rho_x) \cos \rho_y - A_x \sin \rho_y \tag{d}$$

$$N_y = -\tan\left(\frac{\pi}{2} - \arcsin \frac{W}{l_y}\right) N_x \tag{e}$$

$$N_z = -\tan\left(\frac{\arctan \frac{h}{l_x}}{2}\right) N_x \tag{f}$$

$$N_x^2 + N_y^2 + N_z^2 = 1$$

Vectors $\tilde{A}$ and $\tilde{N}$ may be considered dummy variables for calculation purposes only which need not be defined. However, it is convenient to interpret them as follows:

$\tilde{A}$ is the unit surface normal vector (outward) from the groove face before rotation of the side mirror through angles $\rho_x$, $\rho_y$; and $\tilde{N}$ is the unit surface normal vector from the groove face after rotation of the side mirror through angle $\rho_x$ (about the x axis) then through angle $\rho_y$ (about the y axis).

Figure 8:
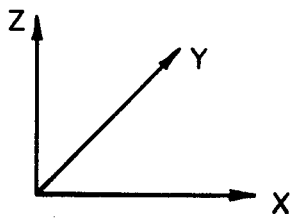
FIG. 8 is an illustration of the coordinate system used to calculate angular values illustrated throughout FIGS. 4–7.

The coordinate system selected which pertains to the above set of equations is a right-hand rectangular system and is as shown in FIG. 8.

In the preferred embodiment, the pitch angle $\beta_2$, of the base mirror groove, as illustrated in FIG. 7, is defined by:

$$\beta_2 = \frac{\pi}{4} - \frac{\arctan \frac{h}{l_x}}{2}, \tag{h}$$

where $\beta_2$ is defined as that part of the included angle between the perpendicular to the base and the side of the groove from which the light is reflected;

$h$ is defined as the height of the side mirror; and $l_x$ is defined as the length of the base mirror as measured in the direction across the grooves of the mirror.

The relationship expressed by the above set of equations allows angle $\beta_1$ to be specified. For instance, if it is desired that the bottom and side mirrors be made from the same mold, angle $\beta_1$ is equal to angle $\beta_2$. Having specified angle $\beta_1$ the equations can be solved for angles $\rho_x$ and $\rho_y$ to determine the appropriate orientation of the side mirror.

If angle $\rho_y$ is specified, as for instance with a vertical side wall where angle $\rho_y$ is equal to zero, then the equations can be solved for the appropriate groove angle $\beta_1$ and groove tilt angle $\rho_x$.

Figure 9:
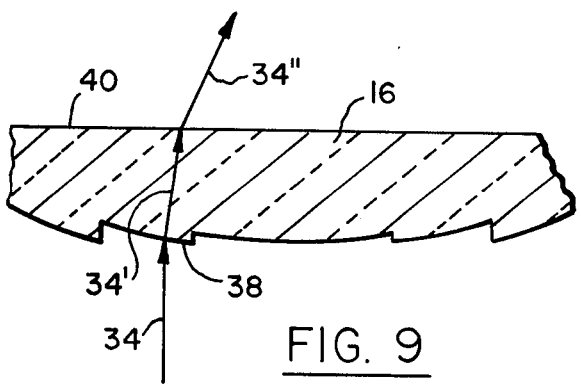
FIG. 9 is a partial sectional view of a Fresnel lens included in the illustration of the embodiment of FIG. 1.

The equations, as set forth within the disclosure, correspond to the right-hand rectangular coordinate vector system, as illustrated in FIG. 8. Parallel light rays which are reflected from the second reflective surface 14 are received by the Fresnel lens 16, as illustrated by exemplary light ray 34 in FIG. 9. The exemplary light ray 34 is refracted at the front surface 38 of the Fresnel lens 16 to pass within the lens 16 as refracted light ray 34'. It is further refracted at the back surface 40 of the Fresnel lens to pass upwardly toward the condensing point F of FIG. 1 as light ray 34".

The Fresnel lens 16 useful in numerous applications for an illuminator, according to the principles of this invention, has an $f$ number, defined as the ratio of the focal length of the lens to the diameter of the lens, which has a value which is relatively high, for example with respect to applications for overhead projectors, and is roughly in a range which is 1 or greater. A single surface Fresnel lens is preferred and it is preferable to have the lens grooves faced toward the reflective mirror to correct for abberations and improve efficiency. A Fresnel lens which is corrected for spherical abberation when used at the focal point is preferred.

Figure 10:
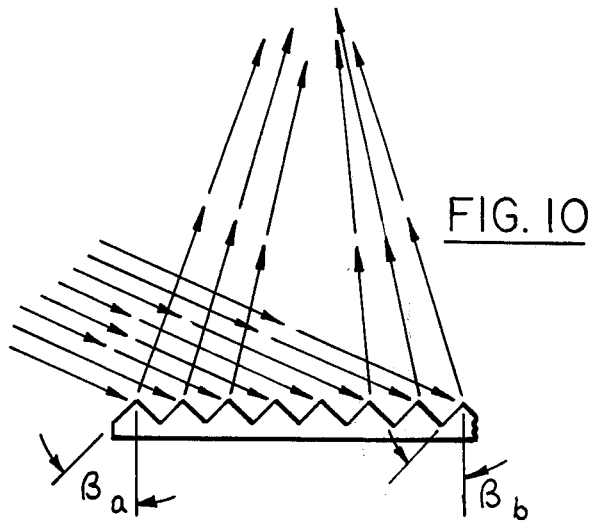
FIG. 10 is a partial illustration of an alternate embodiment of an element illustrated in FIG. 1.

Mirrors 12 and 14 do not introduce power into the system. The light enters the mirrors collimated and leaves them collimated. It is possible to further generalize this system by introducing some Fresnel mirror power into the mirrors. For instance, cylindrical power could be introduced into a mirror by making the pitch angle an appropriate function of position measured perpendicular to the grooves as illustrated by FIG. 10. As illustrated, it is necessary that $\beta_b$ be less than $\beta_a$ since the light rays received at the respective grooved surfaces are to be deviated through different angles. Power is most easily added by modifying the base mirror 14, but can be incorporated into the wall mirror or both if it is preferred to have two dimensional power, which can also be provided by one mirror.

The reflective mirrors and Fresnel lens may be of any suitable material including acrylic or polycarbonate plastic. The mirrors may be fabricated by casting or molding by injection, extrusion or pressing or diamond cut and coated with suitable reflective materials, such as aluminum or silver. Replication techniques such as metal electroforming are suitable processes. It will be appreciated that dust shields or heat absorbers may be incorporated or that diffusers may be added for particular applications and included, for example, at the undersurface of the Fresnel lens.

Satisfactory embodiments for specific applications, for example, have included outside unit dimensions of approximately 11 by 11 by 2 inches, acrylic plastic aluminized mirrors, 0.5 millimeter groove spacing and approximately 104° included groove angles.

Figure 12:
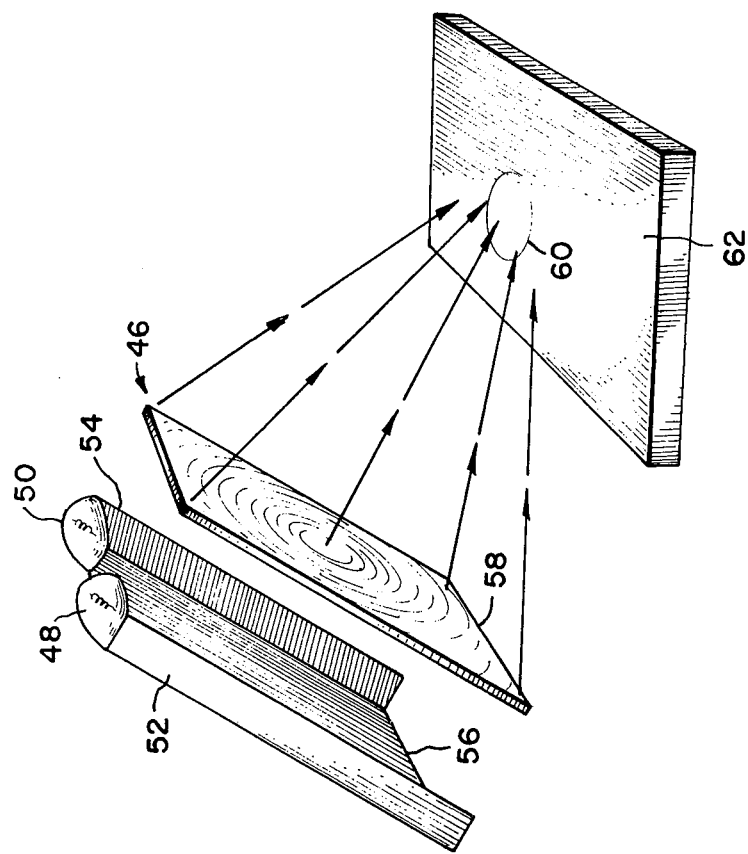
FIG. 12 is a partial exploded view of a lamp incorporating the principles of the present invention.
Figure 11:
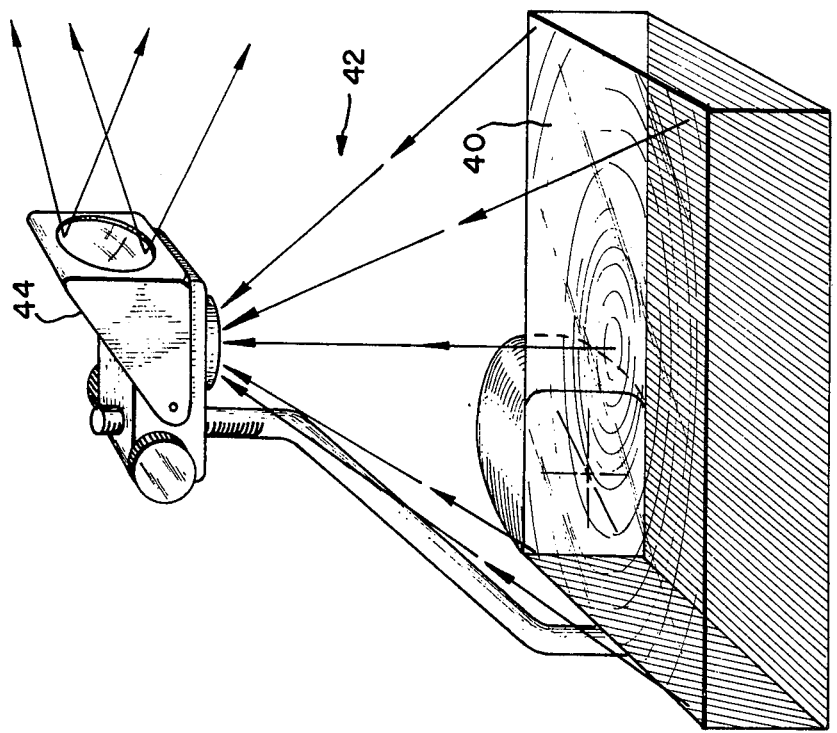
FIG. 11 is a partial schematic illustration of an overhead projector including an embodiment according to the principles of this invention.

Two applications of devices embodying the present invention are illustrated in FIGS. 11 and 12. FIG. 11 illustrates an overhead projector 42 including a condensing illuminator according to the illustrations of FIGS. 1-3, with a tiltable and focusable projection lens assembly 44. The projection lens assembly 44 has an aperture sufficient to accept the condensed light directed toward the spot F, as illustrated in FIG. 1, and is located at the spot F. A transparency would generally be placed upon lens surface 40 for projection onto a screen not illustrated. In FIG. 12, a lamp 46 for use, for example, in the dental or medical profession, is illustrated as having two collimated light sources 48 and 50 separately providing illumination to wall reflective mirrors 52 and 54, respectively, with a single base mirror 56. The Fresnel lens 58 concentrates the light at an area 60 disposed upon a task work area 62.

A myriad of other application exist such as drafting table lamps or other light tables.

It is claimed:

1. An illumination device for condensing light along a given axis toward a defined illumination area, comprising:

a light source for transmitting substantially collimated light;

first reflector means defining a first mirrored planar grating having a grooved area for directly receiving the collimated light transmitted from the light source and disposed to reflect the substantially collimated light to uniformly distribute the light over an area substantially larger than the area of the first mirrored grating;

second reflector means defining a second mirrored grating having reflective grooves of differing pitch for optical power disposed parallel to the plane of the first grating to define an area larger than the area of the first mirrored grating to receive the light reflected by the first reflector means to direct the light by reflection in a condensing pattern about the given axis toward the defined illumination area.

2. The illumination device as defined in claim 1, wherein the first mirrored grating of the first reflector means has reflective grooves of differing pitch for providing optical power.

3. A diascopic illumination device for condensing light directed through an objective stage, comprising:

an objective stage disposed in a plane to receive an object to be observed;

a light source for providing a beam of substantially collimated light in a direction which is substantially parallel to the plane of the objective stage; reflector means defining a first grooved planar reflective surface disposed to directly receive and reflect the substantially collimated light emanating from the light source and further defining a second planar reflective surface with grooves disposed parallel to the plane of the first reflective surface to receive the reflected collimated light from the first reflective surface to direct by reflection the received light toward the objective stage in a substantially parallel beam defined by the perimeter of the second grooved planar reflective surface wherein the first and second reflective surfaces have reflective grooves which are of saw-tooth cross section configuration to define an included angle between sides of respective grooves such that the portion of the included angle which extends between a groove side which reflects light rays and an imaginary perpendicular line to the plane of the reflective surface is equal for both the first and second reflective surfaces; and a fresnel lens disposed between the second reflective surface and the objective stage for receiving the reflected collimated light from the second reflective surface to direct the light through the objective stage and condense the light at a point a predetermined distance from the fresnel lens.

4. The diascopic illumination device as defined in claim 3, wherein the plane of the first grooved reflective surface and the plane of the second reflective surface define an included angle between the reflective surfaces which is more than 90°.

5. An illumination device, comprising:
a light source for transmitting light in a substantially collimated beam; and
reflector means including a first mirrored planar grating having a grooved area for directly receiving the collimated light transmitted from the light source disposed to reflect the substantially collimated light to uniformly distribute the light over an area substantially larger than the area of the first mirrored grating and further including a second mirrored grating having an area larger than the area of the first mirrored grating with grooves disposed parallel to the plane of the first mirrored grating to receive the light reflected by the first mirrored grating to direct the light by reflection in a parallel path wherein the first mirrored planar grating is configured according to the design limits of:

$$\tilde{A} = [\sin \beta_1, -\cos \beta_1, o];$$

$$N_x = A_x \cos \rho_y + (A_z \cos \rho_x + A_y \sin \rho_x) \sin \rho_y;$$

$$N_y = A_y \cos \rho_x - A_z \sin \rho_x;$$

$$N_z = (A_z \cos \rho_x + A_y \sin \rho_x) \cos \rho_y - A_x \sin \rho_y;$$

$$N_y = -\tan\left(\frac{\pi}{2} - \arcsin\frac{W}{l_y}\right) N_x;$$

$$N_z = -\tan\left(\frac{\arctan\frac{h}{l_x}}{2}\right) N_x; \text{ and}$$

$$N_x^2 + N_y^2 + N_z^2 = 1,$$

wherein
$l_x$ is defined by the length of the second mirrored grating as measured in a direction across the grooves of the second mirrored grating;
$l_y$ is defined as the width of the second mirrored grating as measured in a direction along the grooves of the second mirrored grating;
$h$ is defined as the height of the first mirrored grating;
$W$ is defined as the width of the collimated beam of light transmitted from the light source and measured in a direction at a right angle to the direction of the dimension $h$;
$\beta_1$ is defined as the pitch angle of the grooves of the first mirrored grating;
$\tilde{A}$ is defined as the unit surface normal vector (outward) from the groove face before rotation of the first mirrored grating through angles $\rho_x$ and $\rho_y$; and
$\tilde{N}$ is defined as the unit surface normal vector from the first mirrored grating groove face after rotation of the first mirrored grating through angle $\rho_x$ (about the $x$ axis) then through angle $\rho_y$ (about the $y$ axis).

6. The illumination device, as defined in claim 5, wherein the second mirrored grating is configured according to the design limits of:

$$\beta_2 = \frac{\pi}{4} - \frac{\arctan\frac{h}{l_x}}{2}, \quad (h)$$

wherein $\beta_2$ is defined as that part of the included angle between the perpendicular to the second mirrored grating and the side of the groove from which the light is reflected.

7. An illumination device for condensing light along a given axis toward a defined illumination area, comprising:
a light source for transmitting substantially collimated light;
first reflector means defining a first mirrored planar grating having reflective grooves which are disposed at an inclination to the collimated light rays transmitted directly thereto from the light source and disposed to reflect the substantially collimated light to uniformly distribute the light over an area substantially larger than the area of the first mirrored grating;
second reflector means defining a second mirrored grating having an area larger than the area of the first mirrored grating with grooves disposed parallel to the plane of the first reflector means to receive the light reflected by the first reflector means to direct the light by reflection in a parallel path toward the defined illumination area; and
a fresnel lens disposed to receive the light reflected by the second reflector means to direct the light in the direction of the given axis and condense the light about the axis toward a defined area of illumination a predetermined distance from the fresnel lens.

8. An illumination device for condensing light along a given axis toward a defined illumination area, comprising:
a light source for transmitting substantially collimated light;
first reflector means defining a first mirrored planar grating having a grooved area for directly receiving the collimated light transmitted from the light source and disposed to reflect the substantially collimated light to uniformly distribute the light over an area substantially larger than the area of the first mirrored grating;
second reflector means defining a second mirrored grating having an area larger than the area of the first mirrored grating and oriented away from the first mirrored grating for the plane of the first mirrored grating to form with the second mirrored grating an angle therebetween greater than a right angle and wherein the second mirrored grating has grooves disposed parallel to the plane of the first mirrored grating to receive the light reflected by the first mirrored grating to direct the light by reflection in a parallel path toward the defined illumination area; and
a fresnel lens disposed to receive the light reflected by the second reflector means to direct the light in the direction of the given axis and condense the light about the axis toward a defined area of illumination a predetermined distance from the fresnel lens.

9. The illumination device as defined in claim 8 wherein the first mirrored grating has reflective grooves in the grooved area which are inclined with respect to the collimated light transmitted from the light source.

10. An illumination device for condensing light along a given axis toward a defined illumination area, comprising:
- a light source for transmitting substantially collimated light;
- reflector means including a first mirrored planar grating having a grooved area for directly receiving the collimated light transmitted from the light source and disposed to reflect the substantially collimated light to uniformly distribute the light over an area substantially larger than the area of the first mirrored grating, and further including a second mirrored grating having an area larger than the area of the first mirrored grating with grooves disposed parallel to the plane of the first mirrored grating to receive the light reflected by the first mirrored grating to direct the light by reflection in a parallel path toward the defined illumination area, wherein the first and second mirrored gratings respectively have grooves which are of sawtooth cross section configuration to define an included angle between sides of respective grooves such that the portion of the included angle which extends between a groove side which reflects light rays and an imaginary perpendicular line to the plane of the mirrored grating is equal for both the first and second mirrored gratings; and
- a fresnel lens disposed to receive the light reflected by the second mirrored grating to direct the light in the direction of the given axis and condense the light about the axis toward a defined area of illumination a predetermined distance from the fresnel lens.

11. An illumination device for condensing light along a given axis toward a defined illumination area, comprising:
- two light sources each disposed for transmitting substantially collimated light in a direction substantially opposite to the other;
- first reflector means defining a first mirrored planar grating having a grooved area for directly receiving the collimated light transmitted from the light sources and disposed to combine and reflect in the same direction the substantially collimated light to uniformly distribute the light over an area substantially larger than the area of the first mirrored grating;
- second reflector means defining a second mirrored grating having an area larger than the area of the first mirrored grating with grooves disposed parallel to the plane of the first reflector means to receive the light combined and reflected by the first reflector means to direct the light by reflection in a parallel path toward the defined illumination area; and
- a fresnel lens disposed to receive the light reflected by the second reflector means to direct the light in the direction of the given axis and condense the light about the axis toward a defined area of illumination a predetermined distance from the fresnel lens.

12. An illumination device for condensing the light along a given axis toward a defined illumination area, comprising:
- two light sources each transmitting substantially collimated light;
- two first reflector means each defining a first mirrored planar grating having a grooved area for one of the first reflector means to directly receive collimated light transmitted from one of the two light sources and for the other of the first reflector means to directly receive collimated light from the other of the two light sources and each first reflector means disposed to reflect the substantially collimated light to uniformly distribute the light over an area substantially larger than the area of either of the two first mirrored gratings;
- second reflector means defining a second mirrored grating having an area substantially larger than the area of either of the two first mirrored gratings with grooves disposed parallel to the plane of either of the two first mirrored gratings to receive the light reflected by the two first mirrored gratings and to combine and reflect in the same direction the received light in a parallel path toward the defined illumination area; and
- a fresnel lens disposed to receive the light combined and reflected by the second mirrored grating to direct the light in the direction of the given axis and condense the light about the axis toward a defined area of illumination a predetermined distance from the fresnel lens.

* * * * *

UNITED STATES PATENT AND TRADEMARK OFFICE
CERTIFICATE OF CORRECTION

PATENT NO. : 4,118,761
DATED : October 3, 1978
INVENTOR(S) : Thomas W. Dey

It is certified that error appears in the above-identified patent and that said Letters Patent are hereby corrected as shown below:

Col. 2, line 16, delete "reference" and substitute therefore --reflective--;

Col. 6, line 29, after the formula insert --(g)--; and

Col. 8, line 40, "reflector" should be the start of a new subparagraph.

Signed and Sealed this

Nineteenth Day of December 1978

[SEAL]

Attest:

RUTH C. MASON
Attesting Officer

DONALD W. BANNER
Commissioner of Patents and Trademarks